(12) United States Patent
Takahashi et al.

(10) Patent No.: US 6,553,855 B2
(45) Date of Patent: Apr. 29, 2003

(54) DRIVE SYSTEM

(75) Inventors: Kenji Takahashi, Yamanashi-ken (JP); Hidekazu Michioka, Tokyo (JP); Hiroshi Takamatsu, Yamanashi-ken (JP)

(73) Assignee: THK Co., Ltd., Tokyo (JP)

( * ) Notice: Subject to any disclaimer, the term of this patent is extended or adjusted under 35 U.S.C. 154(b) by 16 days.

(21) Appl. No.: 09/820,273

(22) Filed: Mar. 29, 2001

(65) Prior Publication Data

US 2002/0020238 A1 Feb. 21, 2002

(30) Foreign Application Priority Data

Mar. 30, 2000 (JP) .................................. 2000-095183
Nov. 1, 2000 (JP) .................................. 2000-334354

(51) Int. Cl.⁷ ............................................. F16H 29/02
(52) U.S. Cl. ........................................ 74/89.36; 384/13
(58) Field of Search ........................... 74/89.29, 89.33, 74/89.36, 89.35; 384/13, 17; 198/750.1, 750.2, 468.01

(56) References Cited

U.S. PATENT DOCUMENTS

| | | | | |
|---|---|---|---|---|
| 4,252,380 A | * | 2/1981 | Sloyan et al. | 248/657 |
| 4,270,404 A | * | 6/1981 | Murakoshi et al. | 248/913 |
| 4,547,024 A | * | 10/1985 | Teramachi | 384/45 |
| 4,772,899 A | * | 9/1988 | Mamiya et al. | 184/100 |
| 5,156,862 A | * | 10/1992 | Kawaguchi | 425/325 |
| 5,207,115 A | * | 5/1993 | Takei | 108/137 |
| 5,454,278 A | * | 10/1995 | Kasuga | 184/5 |
| 5,732,592 A | * | 3/1998 | Parker | 74/471 XY |
| 5,735,174 A | * | 4/1998 | Enomoto | 74/89.32 |
| 5,871,283 A | * | 2/1999 | Isobe et al. | 384/15 |
| 5,881,466 A | * | 3/1999 | Yamaguchi et al. | 108/137 |
| 5,910,192 A | * | 6/1999 | Pulford et al. | 403/225 |

FOREIGN PATENT DOCUMENTS

| | | |
|---|---|---|
| JP | 2-12554 | 1/1990 |
| JP | 2-012554 | 9/1991 |

* cited by examiner

Primary Examiner—Douglas C. Butler
Assistant Examiner—Benjamin A Pezzlo
(74) Attorney, Agent, or Firm—Armstrong, Westerman & Hattori, LLP

(57) ABSTRACT

A drive system comprises a track table comprising a flat portion, perpendicular side portions extending in parallel to each other along both lateral side edges of the flat portion and at least one partition section formed to the flat portion at a portion between the perpendicular side portions so as to extend in parallel to thereto, the movable tables fitted into a space between one of the perpendicular side portions and the partition section, the movable tables each having lateral side surfaces to which loaded ball rolling surfaces constituting ball circulation passages are formed so as to correspond to the ball rolling surfaces of the track table, a number of balls disposed and arranged in the ball circulation passages so as to circulate therein in accordance with relative movement between the track table and movable table, and a driving unit for driving the track table and the movable table relatively.

8 Claims, 5 Drawing Sheets

DRIVE SYSTEM

BACKGROUND OF THE INVENTION

The present invention relates to a drive system having a wide width structure integrally assembled with a feed screw and a linear guide device, for example.

There is known a drive system having a structure provided with a feed screw as driving means such as ball screw, slide screw or like and a linear guide device. Such drive system essentially comprises a screw shaft formed, at its outer surface, with a spiral groove, a linear guide rail as longitudinal track table arranged in parallel to the screw shaft and a block as movable member assembled with the linear guide rail to be movable along the longitudinal direction thereof, and this movable block is provided with a nut member to be screwed with the screw shaft.

Further, in general, a machine tool, a machine table or like is operatively mounted to such drive system and moved to a desired position and stopped there. This positional control of the machine tool, for example, is performed by controlling the rotational motion of the screw shaft through the operation of a motor or like drive means. As mentioned above, such drive system may be said as a compact feed unit having a good assembling performance and adjustment, and accordingly, has been utilized for various industrial robots, conveying equipments and the like.

For example, as shown in Japanese Utility Model Laid-open Publication No. HEI 2-12554, the drive systems of the type mentioned above generally includes the following two types, one being a straddle-type in which a movable table, having a bottom portion and lateral side portions extending in the longitudinal direction thereof, is straddled on the track table to be movable therealong and the other one being an idly groove-fitting type in which a movable member having a rectangular section is idly fitted into a recessed groove of a track member having box-shaped section to be movable in the longitudinal direction thereof.

In the case where both the above two types are compared with each other at the same rated load, a linear guide device utilizing the idly groove-fitting type can be formed to have a height lower than that of the straddle type, and hence, can be made compact, thus being arranged in a small space. In this meaning, it may be said that the idly groove-fitting type structure is effectively utilized for robots or conveying units which are likely to be used with restricted or reduced space.

The idly groove-fitting type structure will be described more in detail hereunder with reference to FIGS. 7 and 8.

A track table 90 having box-shaped section and having longitudinal extension is composed of a horizontally flat portion as a bottom portion 90a and a pair of lateral side portions standing upward from the bottom portion 90a as viewed in FIG. 7 or 8 so as to form a recessed portion therebetween. The lateral side portions are formed with inner side surfaces 91, 91 to which two rows of upper and lower ball rolling grooves 92, 92 are respectively formed so as to extend in the longitudinal direction in parallel to each other. Further, a screw shaft 93 for the ball screw is arranged in the lateral central portion of the box-shaped track table 90 to be parallel to the ball rolling surfaces 92, 92.

A movable table 94 is a member having a top surface on which a table T or like is mounted to convey a machine tool or like tool, or other articles disposed on the table T. The movable table 94 has a rectangular section and is formed with a nut portion (member) 95 so as to be screwed with the screw shaft 93. The movable table 94 has a width dimension slightly smaller than an inner width dimension of the recessed portion of the track table 90 as can be seen from FIG. 8.

The movable table 94 is hence idly fitted to the recessed portion (groove) of the track table 90. The movable table 94 is formed with lateral side surfaces to which loaded ball rolling surfaces 94a, 94a are formed so as to be opposed respectively to the ball rolling grooves 92, 92 formed to the inside surfaces 91, 91 of the track table 90. Furthermore, ball return passages, each composed of a linear through hole, are formed in a solid portion of the movable table so as to extend in parallel to the loaded ball rolling surfaces 94a, and U-shaped rolling direction changing passages are also formed to the movable table at both longitudinal end portions thereof so as to communicate the loaded ball rolling surfaces 94a with the ball return passages 94b, respectively, thereby constituting an endless ball circulation passage in which a number of balls 97 as rolling members circulate while rolling therealong.

In the operation, when the screw shaft 93 is rotated through the driving of a servo-motor, not shown, the movable table 94 is moved in association with the rotational motion of the screw shaft 93 and guided along the track table 90 in its longitudinal direction. In this operation, the movement of the movable table 94 can be smoothly performed through the rolling motions of steel balls B arranged between the nut member 95 and the screw shaft 93 and the balls 97 arranged between the track table 90 and the movable table 94. Further, a load of an article such as machine tool, table or like article applied to the movable table 94 through the table T on which the article is mounted to be conveyed is directly applied to a number of balls 97 arranged and rolling between the ball rolling surfaces 92, 92 and the loaded ball rolling surfaces 94a, 94a. Furthermore, the ball rolling surfaces 92, the loaded ball rolling surfaces 94a and the balls 97 are arranged so as to make minus the gaps, in dimension, between each of the ball rolling surfaces 92 and each of the balls 97 and between each of the loaded ball rolling surfaces 94a and each of the balls 97 to thereby apply a preload to the balls 97.

However, in a conventional drive system in which the structure mentioned above is simply applied to a drive system having a wide width structure, the bottom portion 90a of the track table 90 having a wide width dimension is likely deformed or bent by a moment load Mc (FIG. 8) in a rolling direction applied to the movable table 94, thereby opening outside the both lateral portions having the inside surfaces 91, 91 to which the ball rolling grooves are formed. As a result, there causes a case where the tight close contact between the ball 97, the ball rolling surface 92 and the loaded ball rolling surface 94a is loosened and it becomes difficult to give a sufficient preload to the ball 97 and a case where the movable table 94 causes a rolling, yawing or pitching motion because of the reduced preload and, hence, a smooth linearly advancing motion cannot be expected, thus being inconvenient.

In order to obviate the defect mentioned above, a prior art has provided one idea that a plurality of such drive systems are arranged side by side in parallel to each other. However, such plural lateral arrangement requires a wide space in the width direction and is not usable for disposing in a narrow limited space. Moreover, such parallel arrangement will require a high performance in the parallel alignment and location working for such requirement and for making minimum an operational resistance also requires much time and labor for an operator, as well as increasing in manufacturing cost for plural drive systems.

SUMMARY OF THE INVENTION

An object of the present invention is to substantially eliminate defects or drawbacks encountered in the prior art mentioned above and to provide a drive system having a wide width structure in which there is less change in preload between a rolling member and a rolling member rolling surface even in a case where a load, particularly, a moment load in the rolling direction, is relatively large, and the dimension in the width direction of the drive system is made compact, and an assembling working can be performed easily and smoothly with reduced manufacturing cost.

This and other objects can be achieved according to the present invention by providing a drive system, particularly having a wide width structure, comprising:

a track table comprising a flat portion, perpendicular side portions extending in parallel to each other along both lateral side edges of the flat portion in a longitudinal direction thereof and at least one partition section formed to the flat portion at a portion between the perpendicular side portions so as to extend in parallel thereto, the perpendicular side portions having inside surfaces to which rolling member rolling surfaces are formed so as to extend in a longitudinal direction thereof and the partition section having both side surfaces to which loaded rolling member rolling surfaces are formed so as to extend in a longitudinal direction thereof;

a plurality of movable tables fitted into a space defined between one of the perpendicular side portions and the partition section or between the partition sections, the movable tables each having lateral side surfaces to which loaded rolling member rolling surfaces constituting rolling member circulation passages are formed respectively so as to correspond to the rolling member rolling surfaces;

a number of rolling members disposed and arranged in the rolling member circulation passages so as to circulate therein in accordance with relative movement between the track table and movable tables; and a drive means for driving the track table and the movable table so as to cause the relative movement therebetween.

In preferred embodiments or examples, each of the movable table is formed with mount portions for mounting an article to be conveyed, which mount portions are formed on said movable tables at a portion which is substantially central on said movable tables along the moving direction thereof, while being offset toward the side portions of the track table.

The track table is an outer rail and the movable tables are inner blocks.

The driving means comprises a feed screw, a feed screw shaft and a motor means operatively connected to the feed screw shaft. When balls are used as rolling members, the feed screw is a ball screw arranged for each movable table, the feed screw shaft is a ball screw shaft for each ball screw, and a plurality of the ball screw shafts are driven synchronously by at least one motor.

The flat portion, the perpendicular side portions and the partition section of the track table are formed integrally with each other. The track table and the movable tables are formed as a linear guide device in assembly.

According to the structure and subject features of the present invention mentioned above, since the partition section is provided for the track table, the flat (bottom) portion thereof cannot be bent even if it has a wide width dimension and, therefore, the anti-moment-loading ability can be improved and the side portions of the track table are not opened outward. Accordingly, preload applied to the rolling members and rolling member rolling surfaces is hardly changed, thus ensuring the smooth movement of the movable table. Furthermore, since it is not necessary to arrange a plurality of guide devices side by side, the location space in the width direction can be reduced, and assembling or arranging time and labour can be reduced with less cost.

Furthermore, since the mount portions (fastening bolt holes) are disposed to the movable table at a portion which is substantially central on said movable table along the moving direction thereof, while being offset toward the side portions of the track table, the load of the article to be conveyed is applied evenly on the respective perpendicular side portions and partition section, so that the anti-moment-loading abilities to the rolling member rolling surfaces can be made substantially equally, thus providing a balanced rigidity. The movable table can be hence more smoothly moved. The formation of the fastening bolt holes as the mount portions can make a mounting of the article to be conveyed entirely easy and smooth, and meke the entire strucure of the moveable table simple and compact.

The natures and further characteristic features of the present invention will be made more clear from the following descriptions made with reference to the accompanying drawings.

DESCRIPTION OF THE PREFERRED EMBODIMENTS

A first preferred embodiment of a drive system of the present invention will be described hereunder first with reference to FIGS. 1 to 4.

Figure 1:
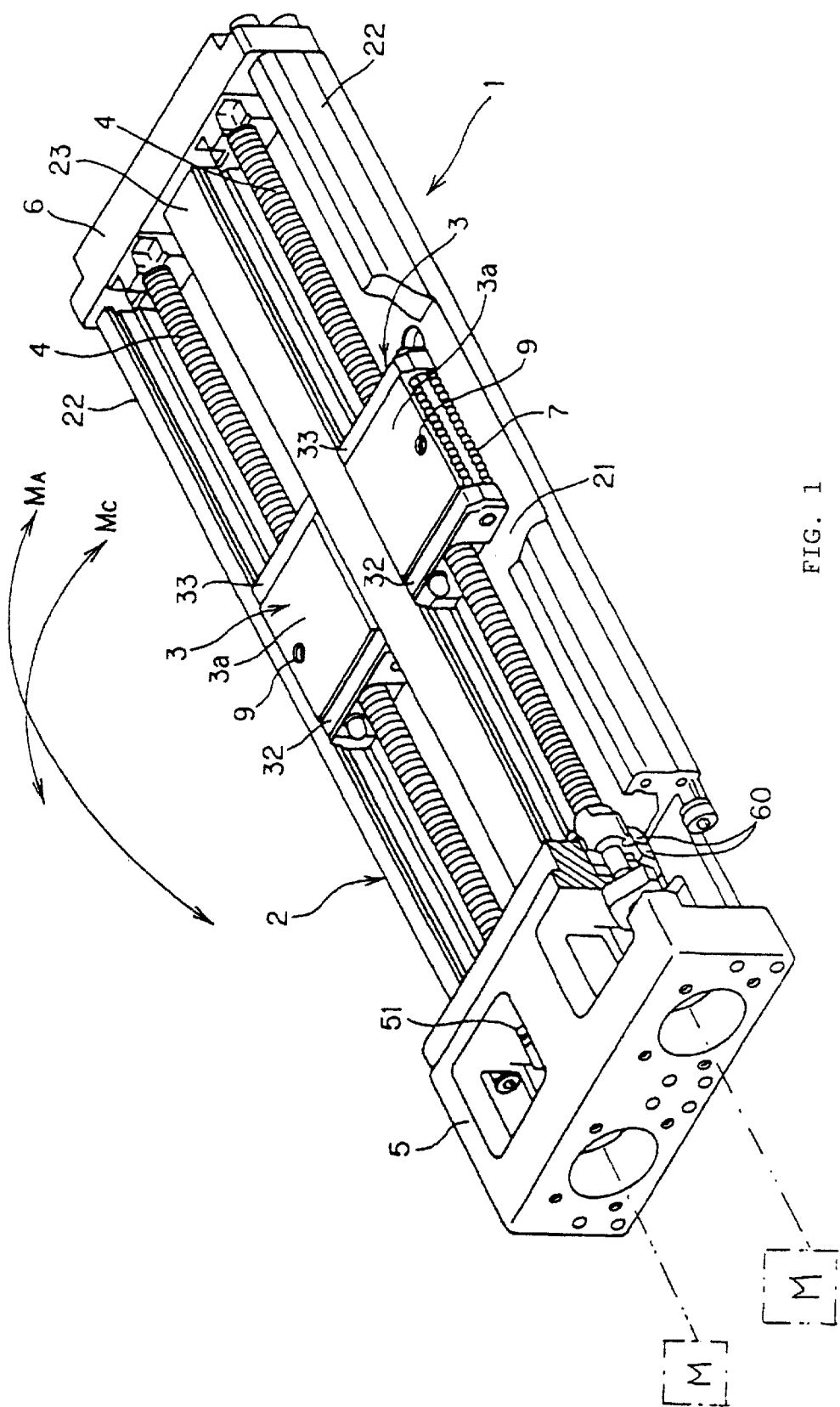
FIG. 1 is a perspective view, partially in section, of a drive system having a wide width structure (dimension) according to one embodiment of the present invention.

A drive system 1 of the present invention is one having a wide width dimension (wide lateral structure) and is referred to hereunder as merely "drive system". Referring to FIG. 1, the drive system 1 comprises an outer rail 2 as a track table having a longitudinal extension, two inner blocks 3, 3 as a movable table (or tables) which can be guided along the outer rail 2, feed screws as drive means including ball screws having ball screw shafts 4, 4 for applying a driving force to relatively move the outer rail 2 and the inner rails 3, 3, and housings 5, 6 supporting front and rear end (longitudinal end) portions of the ball screw shafts 4, 4 to be rotatable.

Figure 2:
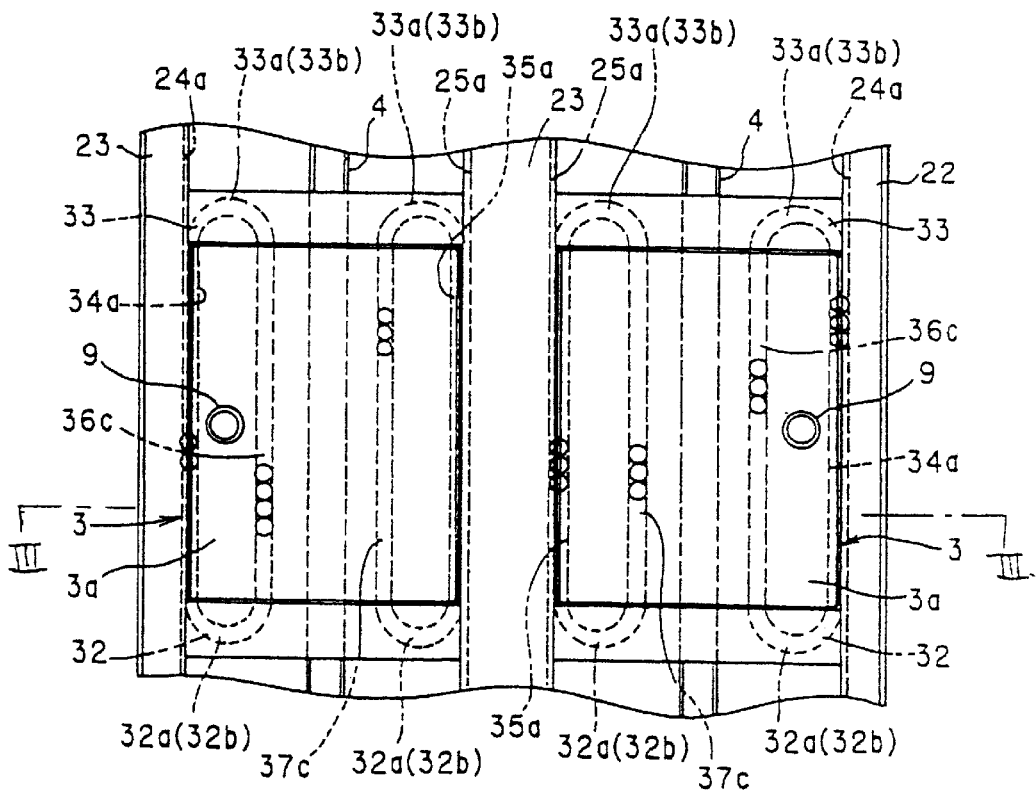
FIG. 2 is a plan view of an essential portion of the drive system of FIG. 1.
Figure 3:
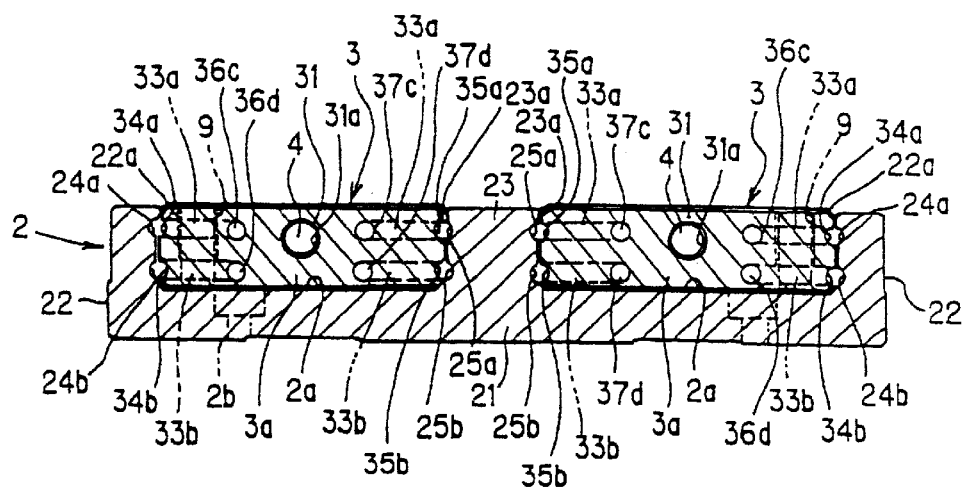
FIG. 3 is a sectional view taken along the line III—III in FIG. 2.

The outer rail 2 is, with reference to FIGS. 2 and 3, composed of a bottom (flat) portion 21, having a flat surface, perpendicular side portions 22, 22 extending in parallel to each other at both lateral sides of the bottom flat portion 21 and one partition section 23 standing from the bottom flat portion 21 as like as side portions 22, 22 and extending in parallel to the side portions 22, 22. According to such structure, the outer rail 2, in an illustrated state (vertically installed state), is formed with two recessed portions having upper openings sectioned by the partition section 23, which extend in the longitudinal direction thereof. The bottom portion 21 of the outer rail 2 is also formed with a plurality of bolt holes 2b, 2b for securing the drive system as one constructional component of, for example, a machine tool by using bolts or like.

In a preferred example, these bottom flat portion 21, side portions 22, 22 and partition section 23 are formed integrally with each other through a molding process, for example. The integral formation will increase rigidity and stiffness of the entire outer rail 2 and reduce manufacturing processes or steps, thus being convenient and economical. However, these portions may be independently formed and thereafter assembled integrally by means of bolt and nut means or like.

Both the perpendicular side portions 22, 22 have inside surfaces 22a, 22a to each of which vertical two rows of ball rolling surfaces (rolling member rolling surfaces) 24a, 24b are formed, and that is, totally four ball rolling surfaces 24a, 24a, 24b, 24b are formed so as to extend in the longitudinal direction thereof. Furthermore, vertically two rows of ball rolling surfaces (rolling member rolling surfaces) 25a, 25b are also formed to each of side surfaces 23a, 23a of the partition section 23 so as to extend in the longitudinal direction thereof.

On the other hand, the inner block 3, 3 are fitted to the two recessed portions 2a, 2a of the outer rail 2 and supported thereby through a number of balls 7, 7, - - - , 7 as rolling members. The inner blocks 3, 3 have side surfaces to which totally eight rows of loaded ball rolling surfaces (loaded rolling member rolling surfaces) 34a, 34a, 34b, 34b are formed so as to correspond (oppose when assembled) to the eight rows of the ball rolling surfaces 24a, 24a, 24b, 24b, 25a, 25a, 25b, 25b of the outer rail 2, respectively, and a number of balls 7, 7, - - - , 7 are arranged between these ball rolling surfaces and loaded ball rolling surfaces, respectively, to be rollable.

Each of the inner blocks 3 is formed, at its central portion, with a nut portion 31 with which the screw shaft 4 is screw-engaged, and the nut portion 31 is composed of a ball screw hole 31a directly formed to penetrate the inner block 3. The ball screw hole 31a is formed, as shown in FIG. 3, at a portion on a line connecting central lines of spans between upper and lower two rows of ball rolling surfaces 34a, 34b, 35a, 35b formed to both the side surfaces of the inner block 3. Further, nut portion 31 may be formed as a member independent from the inner block 3.

Furthermore, the inner blocks 3 are formed with ball return passages 36c, 36c, 36d, 36d, 37c, 37c, 37d, 37d for returning the balls 7 passing the loaded ball rolling area at portions between the respective side surfaces of the inner blocks 3, 3 and the ball screw holes 31a, 31a so as to correspond to the loaded ball rolling surfaces 34a, 34a, 34b, 34b, 35a, 35a, 35b, 35b, respectively. In the illustrated embodiment, these ball return passages 36c, 36c, 36d, 36d, 37c, 37c, 37d, 37d are formed so as to lie on horizontal lines passing the centers of the respective ball rolling surfaces of the outer rail 2 and the respective loaded ball rolling surfaces of the inner blocks 3, 3. Further, preload is applied to all the balls 7, 7, - - - , 7, and such preload will be given by making minus (−) the gaps, in dimension, between each of the ball rolling surfaces 24a—and each of the balls 7—and between each of the loaded ball rolling surfaces 34a—and each of the balls 7—.

Furthermore, as shown in FIGS. 1 to 3, the inner blocks 3, 3 are formed with screw holes (mounting portions) 9, 9 for mounting an article to be conveyed on the top surfaces of the inner blocks 3, 3. The screw holes 9, 9 are bored at portions on the sides of the inside surfaces 22a, 22a of the perpendicular side portions 22, 22 so as to escape from the location of the ball return passages 36c, 36c, 36d, 36d, 37c, 37c, 37d, 37d.

Figure 4:
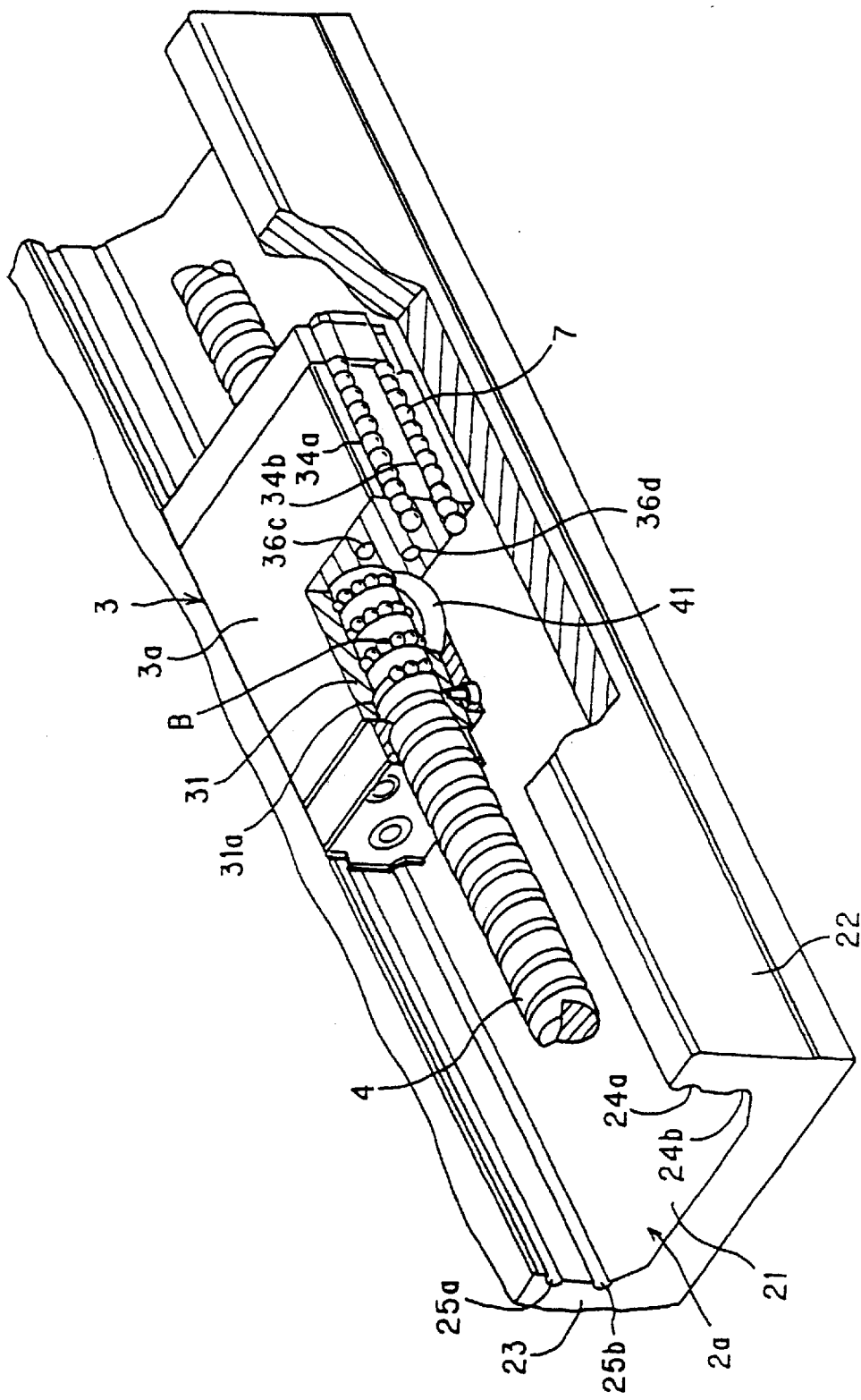
FIG. 4 is a perspective view of an essential portion of the drive system of FIG. 1 in an enlarged scale.

On the other hand, the ball screw holes 31a penetrating the central portions of the inner blocks 3, 3 are formed, on their half portions (areas) in the direction penetrating the inner blocks 3, 3, with screw grooves as shown in FIG. 4, and a return tube 41 is provided for the ball screw holes 31a to thereby form a ball circulation passage. Further, preload is also given to balls B arranged between the ball screw shaft 4 and the ball screw hole 31a.

As shown in FIG. 1 and FIG. 2, the inner blocks 3, 3 are provided, at their longitudinal end portions, with end plates 32, 33, which are preferably formed of synthetic resin material so as to each provide a rectangular shape substantially the same as that of an inner block body 3a formed of metal material. The end plates 32, 33 are fastened to the inner block bodies 3a, 3a by means of screws, for example.

The end plates 32 and 33 are formed, at their mounting surfaces to the inner block bodies 3a, 3a, with rolling direction changing passages 32a, 32a, 32b, 32b, 33a, 33a, 33b, 33b for escaping the balls 7 in the loaded areas between the inner blocks 3, 3 and the outer rail 2 to the ball return passages 36d, 36d, 37c, 37d and again feeding the balls 7 to the loaded areas. That is, four rolling direction changing passages are formed to one end plate. Accordingly, the ball circulation passages are composed respectively of the rolling direction changing passages, the ball return passages and the loaded ball rolling passages. The balls 7, 7, - - - , 7 are disposed and arranged in the ball circulation passages so as to circulate in accordance with the relative movement (motion) between the outer rail 2 and the inner blocks 3, 3. Further, as is self evident, the loaded ball rolling surfaces are disposed on the outer sides of the respective inner blocks 3, 3.

As shown in FIG. 1, each of the ball screw shafts 4, 4 is screwed with the ball screw hole 31a formed to each of the inner blocks 3, 3 and has one end rotatably supported by a bearing portion, not shown, of the housing 6 disposed at one end side of the outer rail 2 and the other end also rotatably supported by a bearing portion 60 of the housing 5 disposed at the other end side of the outer rail 2. These ball screw shafts 4, 4 are operatively coupled to spindles of two motors, not shown, through joint members, respectively.

The drive system having the wide width structure mentioned above will operates in the following manner.

When two motors are driven in the synchronous manner, the ball screw shafts 4, 4 of the drive system 1 are rotated together and the rotational motions thereof are transmitted to the inner blocks 3, 3 through the nut portions 31, 31. The inner blocks 3, 3 are then moved reciprocally in the same direction along the outer rail 2.

During this operation, since the screw holes for fastening the article or like to be conveyed to are formed at positions offset towards both the sides of the outer rail 2 and at the central portions thereof in the moving direction of the inner blocks 3, 3, the load of the article is substantially evenly applied to both the perpendicular side portions 22, 22 and the partition section 23 of the outer rial 2. Therefore, anti-moment-loading (bearing) abilities of the respective ball rolling surfaces can be made equal, so that the ball rolling surfaces can provide laterally balanced rigidity with respect to the load. Thus, the inner blocks 3, 3 are further smoothly linearly movable.

In the described embodiment, since the partition section 23 is formed to the outer rail 2 for partitioning or sectioning two inner blocks 3, 3 arranged side by side to each other, it is possible to prevent the horizontal (bottom flat) portion 21 from being flexed or bent even if the outer rail 2 has a wide width structure or dimension, to improve the anti-moment-loading ability and to obviate the side portions 22, 22 from being opened outside, thus being advantageous and convenient in use.

Accordingly, preload applied to the balls 7 - - - and the ball rolling surfaces is hardly changed, a fluctuation of the inner blocks 3, 3 is effectively prevented, and thus the smooth movement of the inner blocks 3, 3 is ensured.

The flexing or bending prevention effect of the horizontal portion 21 of the outer rail 2 by the location of the partition section 23 will be explained hereunder.

First, with respect to the moment load MA in the pitching direction in FIG. 1, providing that the outer rail 2 is a hull, the partition section 23 will achieve a function of as if a keel, and accordingly, an extremely large rigidity can be provided for the outer rail 2 in this loading direction.

Furthermore, as to the deformation of the outer rail 2, in consideration of deformation like horse-straddle shape based on Poisson's ratio, the partition section 23 can suppress the flexing of the outer rail 2 with respect to the moment load MA in the pitching direction, and accordingly, the flexing to the moment load MC in the rolling direction as shown in FIG. 1 can be also prevented.

Further, the improvement of the anti-moment-loading ability by the location of the partition section 23 mentioned above will lead to the fact that the drive system can provide sufficient strength and rigidity even if the height of the outer rail 2, i.e. the height of the entire structure of the drive system, be reduced.

On the other hand, in order to further improve the anti-moment-loading ability, in addition to the above matter, it may be effective to make thick the thicknesses of the bottom flat portion 21 and perpendicular side portions 22, 22 of the outer rail 2 and to set the thickness at crossing portions of the bottom flat portion 21 and perpendicular side portions 22, 22 of the outer rail 2 to be thick.

Furthermore, according to the embodiment of the present invention, it is not necessary to arrange a plurality of drive systems side by side as in the conventional structure, the location space particularly in the width direction can be reduced, and the drive system can be easily set and arranged, so that the working time and labour of an operator can be reduced as well as reduction of manufacturing cost.

In a modified example, a plurality of inner blocks more than two may be arranged side by side in parallel to each other, and in such arrangement, the number of the partition section 23 will be properly added. In the illustrated embodiment, although the partition section 23 is disposed between adjacent two inner blocks 3, 3, each of which is disposed in each of the recessed portions 2a, in an alternation, two or more than two inner blocks 3, 3 may be disposed in one recessed portion 2a of the outer rail 2. Still furthermore, in the described embodiment, although the screw holes formed to the inner blocks as mounting portions are arranged at positions displaced on both the sides of the outer rail 2, in an alternation, the inner blocks 3, 3 may be respectively coupled to the article to be conveyed on the inner blocks 3, 3 as the movable table.

Figure 5:
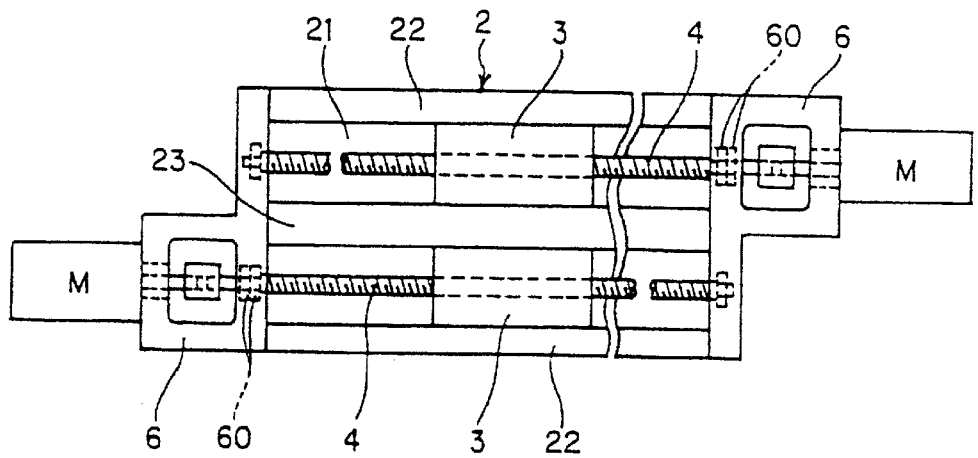
FIG. 5 is a plan view of a drive system according to another embodiment of the present invention.

Still furthermore, in the illustrated embodiment, although two motors are arranged on one end side of the outer rail 2, two motors M, M may be arranged on both end sides thereof as shown in FIG. 5. According to such arrangement, when two motors M, M are driven in a synchronous manner, a large thrusting force is obtainable. It is of course possible to drive these two motors M, M independently without being synchronously driven.

Figure 6:
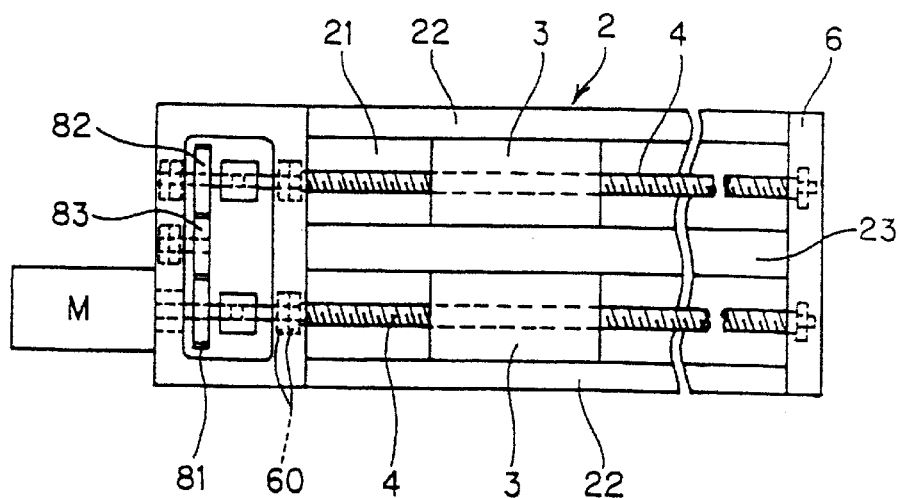
FIG. 6 is also a plan view of a drive system according to a further embodiment of the present invention.
Figure 7:
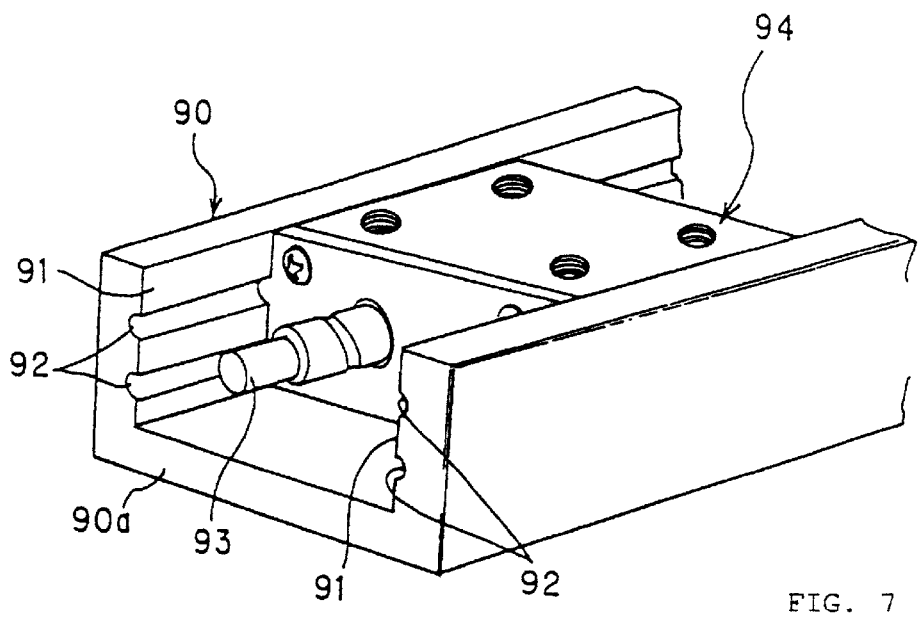
FIG. 7 is a perspective view of an essential portion of a drive system of a conventional structure.
Figure 8:
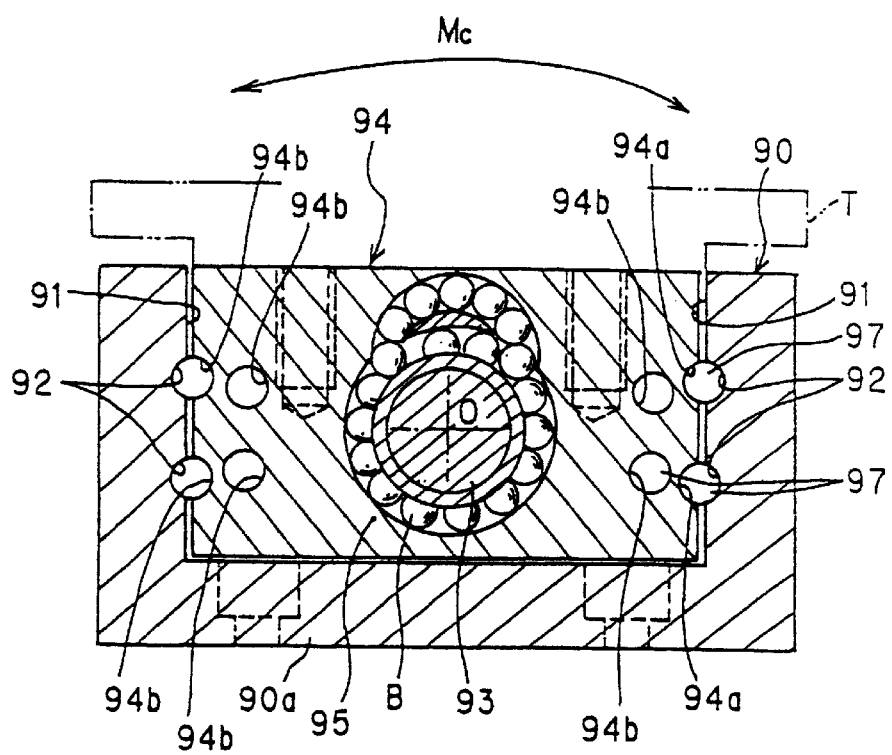
FIG. 8 is a sectional view of the drive system of FIG. 7.

Further, as mentioned above, in the illustrated embodiment with reference to FIG. 5, although two motors are arranged on one end side of the outer rail 2, it is of course possible to drive a plurality of feed screws by a single motor, and FIG. 6 represents an example of such arrangement.

With reference to FIG. 6, an output shaft (driving shaft) of one motor M is operatively coupled to one of the two ball screw shafts 4, 4 through a coupler. A driving gear 81 is mounted to this output shaft, and this driving gear 81 is meshed with a driven gear 82, coupled to the other one ball screw shafts 4, 4 through an idle gear 83. According to this structure, when the motor M is driven, two ball screw shafts 4, 4 are synchronously driven and rotated together to thereby move both the inner blocks 3, 3 in the synchronous fashion.

In the arrangement of FIG. 6, the driving gear 81 may be directly meshed with the driven gear 82 with no location of the idle gear 83, and in such arrangement, right-handed screw and left-handed screw are utilized for the respective ball screw shafts 4, 4, whereas, in the former example in which the idle gear 83 is utilized, same directional (right-handed or left-handed) ball screw shafts 4, 4 are utilized.

Furthermore, a slide screw may be utilized as a feed screw in place of the ball screw in the described embodiment, and also, rollers may be utilized as rolling members in place of the balls 7 and B in the described embodiment.

Still furthermore, in the described embodiment, although the feed screw is utilized as driving means for carrying out the relative motion between the outer rail 2 and the inner blocks 3, 3, another driving means such as linear motor may be utilized as driving means. In the case of the linear motor, a cylindrical magnet may be used as stator and an annular coil applied to the magnet may be used as a movable element.

Still furthermore, in the above description, the linear motion between the outer rail 2 and the inner blocks 3, 3 were mentioned, but there is also adopted a structure in which the outer rail 2 and the inner blocks 3, 3 are relatively movable in a curvilinear manner.

It is to be noted that the present invention is not limited to the described embodiments and preferred alternations, many other changes and modifications may be made without departing from the scopes of the appended claims.

What is claimed is:

1. A drive system comprising:
a track table comprising a flat portion, perpendicular side portions extending in parallel to each other along both lateral side edges of the flat portion in a longitudinal direction thereof and at least one partition section formed to the flat portion at a portion between the perpendicular side portions so as to extend in parallel to thereto, said perpendicular side portions having inside surfaces to which rolling member rolling surfaces are formed so as to extend in a longitudinal direction thereof and said partition section having both side surfaces to which loaded rolling member rolling surfaces are formed so as to extend in a longitudinal direction thereof;

a plurality of movable tables fitted between said perpendicular side portions and said partition section, said movable tables each having lateral side surfaces to which loaded rolling member rolling surfaces constituting rolling member circulation passages are formed respectively so as to correspond to both said loaded rolling member rolling surfaces of said partition section;

a number of rolling members disposed and arranged in said rolling member circulation passages so as to circulate therein in accordance with relative movement between the track table and movable tables; and a drive means for driving said track table and said movable tables so as to cause the relative movement therebetween.

2. A drive system according to claim 1, wherein each of said movable tables is formed with mount portions for mounting an article to be conveyed, which mount portions are formed on said movable tables at a portion which is substantially central on said movable tables along the moving direction thereof, while being offset toward the side portions of the track table.

3. A drive system according to claim 2, wherein said mount portions are screw holes formed to the movable tables.

4. A drive system according to claim 1, wherein said track table is an outer rail and said movable tables are inner blocks.

5. A drive system according to claim 1, wherein said driving means comprises a feed screw, a feed screw shaft and a motor means operatively connected to the feed screw shaft.

6. A drive system according to claim 5, wherein said rolling members are balls, said feed screw is a ball screw arranged for each movable table, said feed screw shaft is a ball screw shaft for each ball screw, and a plurality of said ball screw shaft are driven synchronously by at least one of motors.

7. A drive system according to claim 1, wherein the flat portion, the perpendicular side portions and the partition section of said track table are formed integrally with each other.

8. A drive system according to claim 1, wherein said track table and said movable tables are formed as a linear guide device in assembly.

* * * * *